United States Patent
Tagawa et al.

(10) Patent No.: US 9,283,473 B2
(45) Date of Patent: Mar. 15, 2016

(54) GAME PROVIDING DEVICE

(71) Applicant: DeNA Co., Ltd., Tokyo (JP)

(72) Inventors: Keisuke Tagawa, Tokyo (JP); Yoshiki Watabe, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 209 days.

(21) Appl. No.: 14/034,356

(22) Filed: Sep. 23, 2013

(65) Prior Publication Data

US 2014/0121012 A1    May 1, 2014

(30) Foreign Application Priority Data

Oct. 26, 2012    (JP) .................................. 2012-237181

(51) Int. Cl.
*A63F 13/00* (2014.01)
*A63F 13/06* (2006.01)
*A63F 13/12* (2006.01)

(Continued)

(52) U.S. Cl.
CPC ................. *A63F 13/00* (2013.01); *A63F 13/06* (2013.01); *A63F 13/12* (2013.01); *A63F 2300/1068* (2013.01); *A63F 2300/204* (2013.01);

(Continued)

(58) Field of Classification Search
CPC ......... A63F 13/00; A63F 13/55; A63F 13/56; A63F 13/20; A63F 13/40; A63F 13/42; A63F 13/426; A63F 13/214; A63F 13/219; A63F 13/573; A63F 2300/1075; A63F 2300/1068; A63F 2300/646; A63F 2300/6045; A63F 13/06; A63F 13/12; A63F 2300/204; A63F 2300/306; A63F 2300/807
See application file for complete search history.

(56) References Cited

U.S. PATENT DOCUMENTS 5,340,061 A * 8/1994 Vaquier et al. ................ 244/175
7,637,813 B2   12/2009 Katayama et al.

(Continued)

FOREIGN PATENT DOCUMENTS

JP   2002-239217   8/2002
JP   2003-225463   8/2003

(Continued)

OTHER PUBLICATIONS

Japanese Office Action mailed on Feb. 17, 2015 in connection with Japanese Patent Application No. 2012-237181 and English translation thereof.

(Continued)

*Primary Examiner* — David L Lewis
*Assistant Examiner* — Matthew D. Hoel
(74) *Attorney, Agent, or Firm* — Pillsbury Winthrop Shaw Pittman LLP

(57) ABSTRACT

One object of the present invention is to produce an operation method that allows a player to enjoy moving a character in a game space. In accordance with an aspect, the server device according to an embodiment includes an information storage unit for storing information, a game progression control unit for controlling progression of a game, a display image generating unit for generating an image to be displayed on a display device of the terminal device and displaying the image on the display device, a moving direction setting unit for setting a moving direction of a player character which is operated by the player, a player character control unit for controlling the movement of the player character in the game space, and a non-player character control unit for controlling the movement of a non-player character which is not operated by the player.

15 Claims, 14 Drawing Sheets

(51) Int. Cl.
*A63F 13/20* (2014.01)
*A63F 13/30* (2014.01)

(52) U.S. Cl.
CPC ... *A63F2300/306* (2013.01); *A63F 2300/6045* (2013.01); *A63F 2300/807* (2013.01)

(56) References Cited

U.S. PATENT DOCUMENTS

| | | | |
|---|---|---|---|
| 8,167,692 B2 | 5/2012 | Katayama et al. | |
| 2005/0176486 A1 | 8/2005 | Nishimura et al. | 463/4 |
| 2007/0115452 A1 | 5/2007 | Moest et al. | 355/77 |
| 2011/0212775 A1 | 9/2011 | Sano et al. | 463/31 |
| 2011/0285636 A1 | 11/2011 | Howard et al. | 345/173 |
| 2011/0300934 A1 | 12/2011 | Toy et al. | 463/31 |
| 2012/0007882 A1 | 1/2012 | Sakurai et al. | |
| 2014/0121012 A1 | 5/2014 | Tagawa et al. | |

FOREIGN PATENT DOCUMENTS

| | | |
|---|---|---|
| JP | 2006-150062 | 6/2006 |
| JP | 2008-210126 | 9/2008 |
| JP | 4258850 | 4/2009 |
| JP | 2011-258149 | 12/2011 |
| JP | 2011-258151 | 12/2011 |
| JP | 5735472 B2 | 6/2015 |

OTHER PUBLICATIONS

Japanese Office Action mailed on Oct. 14, 2014 in connection with Japanese Patent Application No. 2012-237181 and English translation thereof.

Final Fantasy III Walkthrough, Oct. 2, 2014, URL, http://iphoneac.com /FF3.html.

"On-line War RPG game 'Million Versus' popular on mobile phones is now available on Android phones. Data transfer from the previously used phone to new phone is also OK!", Oct. 2, 2014, URL, http://www.tabroid.jp/app/games/2011/10/jp.co.ateam.mva.html.

Extended European Search Report mailed on May 14, 2014 in connection with European Patent Application No. 13186940.6.

Non-Final Office Action as issued in Japanese Patent Application No. 2015-084237, dated Nov. 27, 2015.

* cited by examiner

Fig. 3

| Game Content ID | Game Content Type | Position |
|---|---|---|
| 001542 | Player Character | 464618,644124 |
| ... | ... | ... |
| 002015 | Non-player Character (Enemy) | 846692,215814 |
| ... | ... | ... |
| 024511 | Treasure Box | 0824069.00488 |
| ... | ... | ... |

Game Content Management Table

GAME PROVIDING DEVICE

CROSS-REFERENCE TO RELATED APPLICATIONS

This application is based on and claims the benefit of priority from Japanese Patent Application Serial No. 2012-237181 (filed on Oct. 26, 2012), the contents of which are hereby incorporated by reference in their entirety.

TECHNICAL FIELD

The present invention relates to a game providing device, and in particular to a game providing device for providing a game wherein players operate player characters in a game space.

BACKGROUND

Conventionally known such games provided by a game providing device include a role playing game wherein a player moves a character in a game space and enjoy battles with enemy characters and conversation with other characters in the game space, while attempting to clear given missions for progressing the story (see, e.g., Japanese Patent Application Publication No. 2002-239217). When such games are played on a game-dedicated machine, a character can be relatively freely moved in a game space by using a dedicated controller. Meanwhile, such games have recently been played on terminal devices other than game-dedicated machines (personal computers, mobile phones, smart phones, tablet terminals, etc.)

However, when such games are played on a terminal device not having a dedicated controller, the operability of characters in a game space tends to be low as compared to the case where a dedicated controller is used. Thus, in role playing games provided for mobile phones and smart phones for example, a game space is represented with a limited number of landscape images that are switched in accordance with instructions from a player as in a picture card story, thereby to represent movement in the game space; but such a method does not provide sufficient playability in movement in the game space. It is desired to produce an operation method that allows a player to enjoy moving a character in a game space even without a dedicated controller.

SUMMARY

One object of the present invention is to produce an operation method that allows a player to enjoy moving a character in a game space. Other objects of the present invention will be clarified by reference to the entire description in this specification.

A game providing device according to an embodiment of the present invention is a game providing device for providing a game wherein a player operates a player character in a game space, the game providing device being communicatively connected to a display device having a touch panel, the game providing device comprising: a display image generating unit configured to generate a display image including an image of the game space corresponding to a current position of the player character in the game space and display the display image on the display device; a moving direction setting unit configured to set a moving direction of the player character based at least on a type of an object on the display image corresponding to a position of a touch operation on the touch panel by the player; and a player character control unit configured to control the player character such that the player character moves in the set moving direction.

A program according to an embodiment of the present invention is a program for causing a computer to serve as a game providing device for providing a game wherein a player operates a player character in a game space, the computer being communicatively connected to a display device having a touch panel, the program causing the computer to perform: a display image generating process for generating a display image including an image of the game space corresponding to a current position of the player character in the game space and displaying the display image on the display device; a moving direction setting process for setting a moving direction of the player character based at least on a type of an object on the display image corresponding to a position of a touch operation on the touch panel by the player; and a player character control process for controlling the player character such that the player character moves in the set moving direction.

A game providing system according to an embodiment of the present invention is a game providing system including: a terminal device having a display device with a touch panel; and a server device communicatively connected to the terminal device, the game providing system comprising: a display image generating unit configured to generate a display image including an image of a game space corresponding to a current position of a player character in the game space and display the display image on the display device; a moving direction setting unit configured to set a moving direction of the player character based at least on a type of an object on the display image corresponding to a position of a touch operation on the touch panel by a player; and a player character control unit configured to control the player character such that the player character moves in the set moving direction.

A method according to an embodiment of the present invention is a method using a computer for providing a game wherein a player operates a player character in a game space by using a display device having a touch panel, the method comprising the steps of: (a) generating a display image including an image of the game space corresponding to a current position of the player character in the game space and displaying the display image on the display device; (b) setting a moving direction of the player character based at least on a type of an object on the display image corresponding to a position of a touch operation on the touch panel by the player; and (c) controlling the player character such that the player character moves in the set moving direction.

Various embodiments of the present invention produce an operation method that allows a player to enjoy moving a character in a game space.

BRIEF DESCRIPTION OF THE DRAWINGS

FIG. 3 is a diagram showing an example of a game content management table according to an embodiment.

DESCRIPTION OF EXAMPLE EMBODIMENTS

Figure 1:
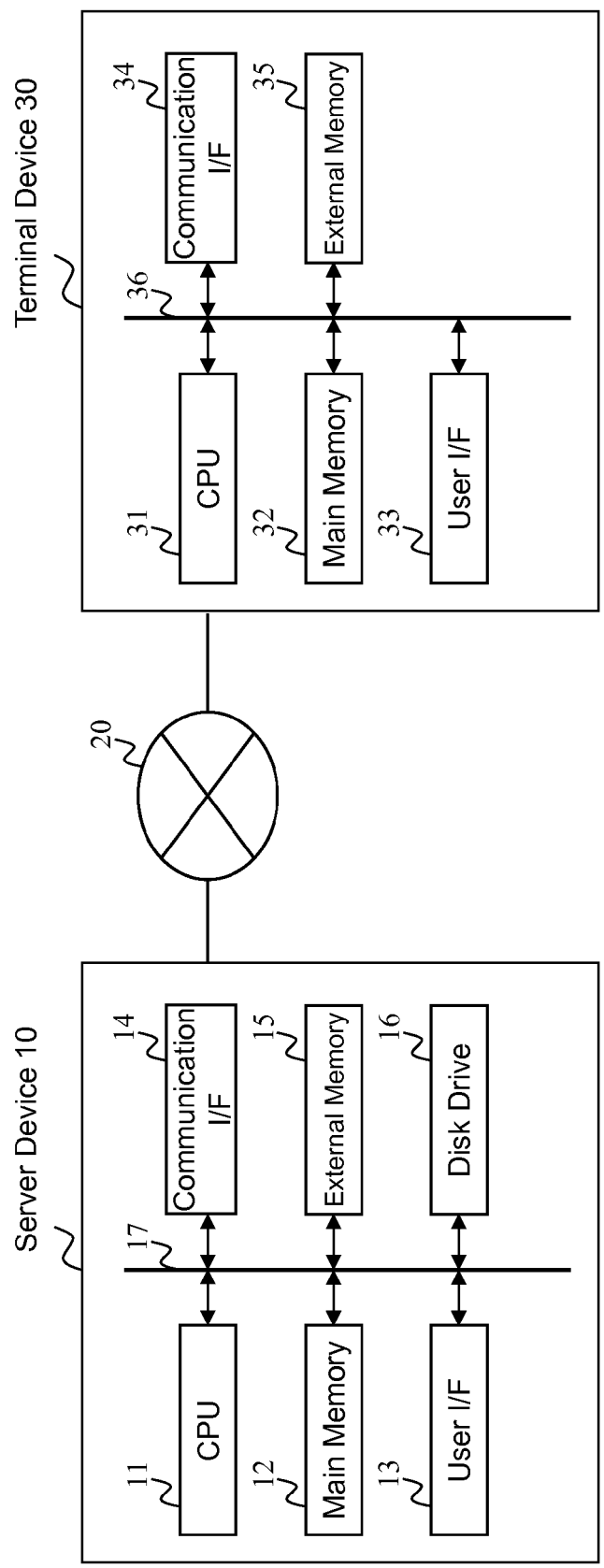
FIG. 1 is a block diagram schematically illustrating a system including a server device for serving as a game providing device according to an embodiment of the present invention.

Various embodiments of the present invention will be described hereinafter with reference to the drawings. In the drawings, the same components are denoted by the same reference numerals.

FIG. 1 is a block diagram schematically illustrating a system including a server device 10 for serving as a game providing device according to an embodiment of the present invention. As shown in FIG. 1, the server device 10 according to an embodiment may be communicatively connected to a terminal device 30 via a communication network 20 such as the Internet and may provide a game to a player operating the terminal device 30. Additionally, the server device 10 may be communicatively connected to terminal devices not shown and other than the terminal device 30.

As illustrated in FIG. 1, the server device 10 may include a central processing unit (CPU) 11, a main memory 12, a user interface (I/F) 13, a communication I/F 14, an external memory 15, and a disk drive 16, and these components may be electrically connected to one another via a bus 17. The CPU 11 may load an operating system and various programs for controlling the progress of an online game into the main memory 12 from the external memory 15, and may execute commands included in the loaded programs. The main memory 12 may be used to store a program to be executed by the CPU 11, and may be formed of, for example, a dynamic random access memory (DRAM).

The user I/F 13 may include, for example, an information input device such as a keyboard or a mouse for accepting an input from an operator, and an information output device such as a liquid crystal display for outputting calculation results of the CPU 11. The communication I/F 14 may be implemented as hardware, firmware, or communication software such as a transmission control protocol/Internet protocol (TCP/IP) driver or a point-to-point protocol (PPP) driver, or a combination thereof, and may be configured to be able to communicate with the terminal devices 30 via the communication network 20.

The external memory 15 may be formed of, for example, a magnetic disk drive and store various programs such as a control program for controlling the progress of an online game. The external memory 15 may also store various data used in the game. The various data that may be stored in the external memory 15 may also be stored on a database server communicatively connected to the server device 10 and physically separate from the server device 10. The disk drive 16 may read data stored in a storage medium such as a compact disc read only memory (CD-ROM), digital versatile disc read only memory (DVD-ROM), or DVD Recordable (DVD-R) disc, or writes data to such a storage medium. For example, a game application and data such as game data stored in a storage medium may be read by the disk drive 16, and may be installed into the external memory 15.

In an embodiment, the server device 10 may be a web server for managing a web site including a plurality of hierarchical web pages and may be capable of providing the terminal devices 30 with game services. The terminal devices 30 may fetch HTML data for rendering a web page from the server device 10 and analyze the HTML data to present the web page to a user (a player of the game) of the terminal devices 30. A game provided through such a web page is sometimes called a browser game. The HTML data for rendering the web page may also be stored on the external memory 15. HTML data may comprise HTML documents written in markup languages such as HTML; the HTML documents may be associated with various images. Additionally, the HTML documents may include programs written in script languages such as ActionScript™ and JavaScript™.

The external memory 15 may store game applications to be executed on execution environments of the terminal device 30 other than browser software. This game application may include game programs for performing a game and various data such as image data to be referred to for executing the game programs. The game programs may be created in, for example, object oriented languages such as Objective-C™ and Java™. The created game programs may be stored on the external memory 15 in the form of application software along with various data. The application software stored on the external memory 15 may be delivered to a terminal device 30 in response to a delivery request. The application software delivered from the server device 10 may be received by the terminal device 30 through a communication I/F 34 in accordance with the control of CPU31; the received game programs may be sent to an external memory 35 and stored thereon. The application software may be launched in accordance with the player's operation on the terminal device 30 and may be executed on a platform implemented on the terminal device 30 such as NgCore™ or Android™. The server device 10 may provide the game applications executed on the terminal devices 30 with various data required for progression of the games. Additionally, the server device 10 can store various data sent from the terminal device 30 for each player, thereby managing the progression of the game for each player.

Thus, the server device 10 may manage the web site for providing game services and deliver web pages constituting the web site in response to a request from the terminal device 30, thereby progressing the game. Also, the server device 10 can progress a game by communicating with a game application performed on the terminal device 30 in place of, or in addition to, such a browser game. Whichever mode may be taken to provide the game, the server device 10 can store data required to progress the game for each identification identifying a player. Briefly, the server device 10 may also include a function to authenticate a player at start of the game and perform charging process in accordance with progression of the game. The games provided by the server device 10 may include desired games such as action games, role playing games, interactive baseball games, and card games. The types of the games implemented by the web site or game applications of the server device 10 are not limited to those explicitly described herein.

In an embodiment, the terminal device 30 may be any information processing device that may display on a web browser a web page of a game web site obtained from the server device 10 and include an application executing environment for executing game applications.

Figure 2:
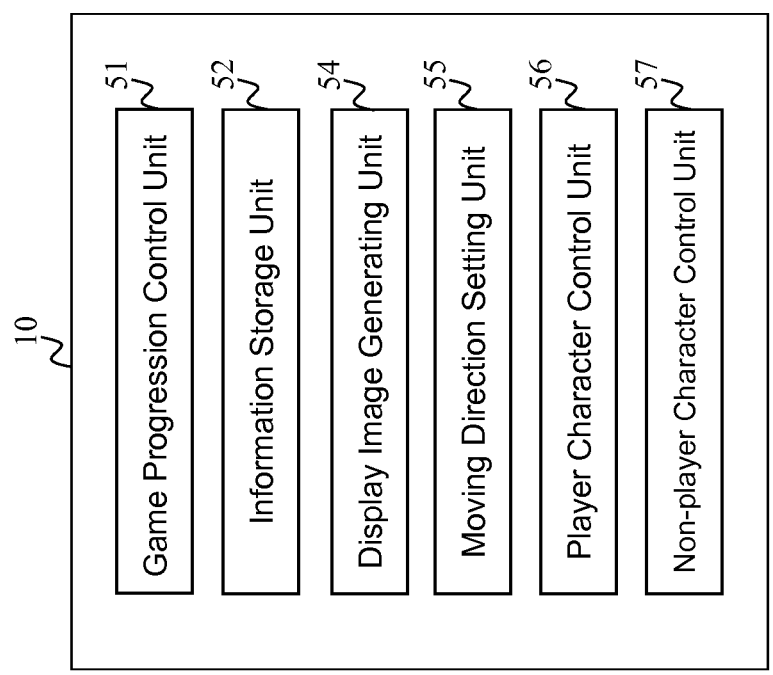
FIG. 2 is a block diagram illustrating the functionality of the server device according to an embodiment.

As illustrated in FIG. 2, the terminal device 30 may include a central processing unit (CPU) 31, a main memory 32, a user interface (I/F) 33, a communication I/F 34, and an external memory 35, and these components may be electrically connected to one another via a bus 36.

The CPU 31 may load various programs such as an operating system into the main memory 32 from the external memory 35, and may execute commands included in the loaded programs. The main memory 32 may be used to store a program to be executed by the CPU 31, and may be formed of, for example, a dynamic random access memory (DRAM).

The user I/F 33 may include an information input device for receiving user inputs and an information output device for outputting an operation result of CPU 31; and the user I/F in an embodiment may include a display device such as a liquid crystal display having a touch panel. When a fingertip or a dedicated pen touches any position on the touch panel, the touching may be detected as a touching operation made by the user, and an electric signal indicating the touched position may be inputted into the CPU 31.

The communication I/F 34 may be implemented as hardware, firmware, or communication software such as a transmission control protocol/Internet protocol (TCP/IP) driver or a point-to-point protocol (PPP) driver, or a combination thereof, and may be configured to be able to communicate with the server device 10 via the communication network 20.

The external memory 35 may comprise, for example, a magnetic disk drive or a flash memory and store various programs such as an operating system. When receiving a game application from the server device 10 via the communication I/F 34, the external memory 35 may store the received game application.

A terminal device 30 having such an architecture may include, for example, browser software for interpreting an HTML file (HTML data) and rendering a screen; this browser software may enable the terminal device 30 to interpret the HTML data fetched from the server device 10 and render web pages corresponding to the received HTML data. Further, the terminal device 30 may include plug-in software (e.g., Flash Player distributed by Adobe Systems Incorporated) embedded into browser software; therefore, the client device 30 can fetch from the server device 10 a SWF file embedded in HTML data and execute the SWF file by using the browser software and the plug-in software.

When a game is executed on the terminal device 30, for example, animation or an operation icon designated by the program may be displayed on a screen of the terminal device 30. The player may enter an instruction for causing the game to progress using an input interface of the terminal device 30. The instruction entered by the player may be transmitted to the server device 10 through the browser of the terminal device 30 or a platform function such as NgCore™.

Next, the functionality of the server device 10 implemented by the components shown in FIG. 1 will now be described. As described above, the server device 10, which can provide various games, will now be described with a focus on functions related to role playing games. Role playing games are examples suitable for description of an embodiment of the present invention FIG. 2 is a block diagram illustrating the functionality of a server device 10 according to an embodiment of the present invention. As shown, the server device 10 may include an information storage unit 52 for storing information, a game progression control unit 51 for controlling progression of a game, a display image generating unit 54 for generating an image to be displayed on a display device of the terminal device 30 and displaying the image on the display device; a moving direction setting unit 55 for setting a moving direction of a player character which is operated by a player, a player character control unit 56 for controlling the movement of the player character in the game space, and a non-player character control unit 57 for controlling the movement in the game space of a non-player character which is not operated by the player. These functions may be implemented through cooperation between the CPU 11 of the server device 10 and programs, tables, and the like stored in the main memory 12 and the external memory 15.

The game progression control unit 51 may send and receive various data required for the progression of the game to and from the terminal device 30 and manage such data for each player, thereby controlling the progression of the game for each player. For example, the game progression control unit 51 can sequentially display, on the terminal device 30, web pages constituting a web site for providing game services in response to a request from the terminal device 30. When a hyperlink on the displayed web page is selected by the player, the game progression control unit 51 may send new HTML data corresponding to the hyperlink to the terminal device 30. The terminal device 30 may display a web page based on the new HTML data. Thus, the game progression control unit 51 may control the game such that web pages stored on the server device 10 are sequentially provided to the terminal device 30 in accordance with the operation by the player; and the player can progress the game by his own operation through the function of the game progression control unit 51.

When the terminal device 30 executes the game application, the game progression control unit 51 can send various data used in the game to the game application. For example, when receiving from a game application on the terminal device 30 a control signal indicating that a certain mission has been cleared, the game progression control unit 51 may provide the game application with various parameters related to a mission subsequent to the cleared mission. The game application may load the data provided by the server device 10 and progress the game.

The terminal device 30 can appropriately send to the server device 10 various information on progression of the game such as information indicating various parameter values used in the game (information on earned game points and earned items) and information indicating a status (information specifying a fulfilled mission), through the function of browser software or the game application. The game progression control unit 51 may store, for each player, information on the progression of the game received from a plurality of terminal devices 30, thereby controlling the progression of the game for each player. Thus, when the player logs in the server device 10 using his own ID, the game may be resumed from the stage corresponding to the progression of the player (e.g., the stage where the game was interrupted) based on the information on the progression of the game associated with the player stored in the server device 10. The information required for the progression of the game may also be managed by various functions of the server device 10 other than the game progression control unit 51.

The information storage unit 52 may store various information used in the role playing game and include, for example, a landform data DB for managing landform data used to render landform images in the game space and a game content management table for managing information on game contents such as characters and items in the game space. FIG. 3 shows examples of information managed in the game content management table included in the information storage unit 52. As shown, the game content management table may store information such as "Game Content ID" identifying game contents, "Game Content Type" indicating the types of the game contents, and "Position" indicating the positions in the game space where the game contents are present. Examples of "Game Content Type" may include player character, non-player character, treasure box, and item. The column "Position" may store positions in the game space where the game contents are present in a two-dimensional position coordinate.

Next, operations of such a server device 10 as an embodiment of the present invention will now be described, wherein a role playing game will be taken as an example. A role playing game in an embodiment may provide game spaces of virtual caves and forests that contain player characters, non-player characters, items for advantageously progressing the game, treasure boxes, etc. A player may move a player character in the game space, while battling with a non-player character (enemy character), having conversation with a non-player character to obtain information advantageous for progressing the game, and acquiring an item or a treasure box, thereby progressing the game. Further, in an embodiment, a game target is set to clearing a predetermined number (e.g., five) of missions. More specifically, pass points corresponding to the missions are set at some positions in the game space; when a player wins a battle with a boss character present at the pass points, a corresponding mission may be cleared. The game target may be fulfilled when all the missions are cleared. In an embodiment, in addition to the player character of the player, player characters of other players may appear in the game space; such player characters of other players are controlled by the player character control unit 56 based on the operation by the other players on other terminal devices 30 (the player characters may appear either in or not in synchronization with operation by the other players). The condition to clear a mission may not be limited to winning a battle with a boss character, and may be, for example, opening a treasure box at a pass point or reaching a pass point.

Figure 4:
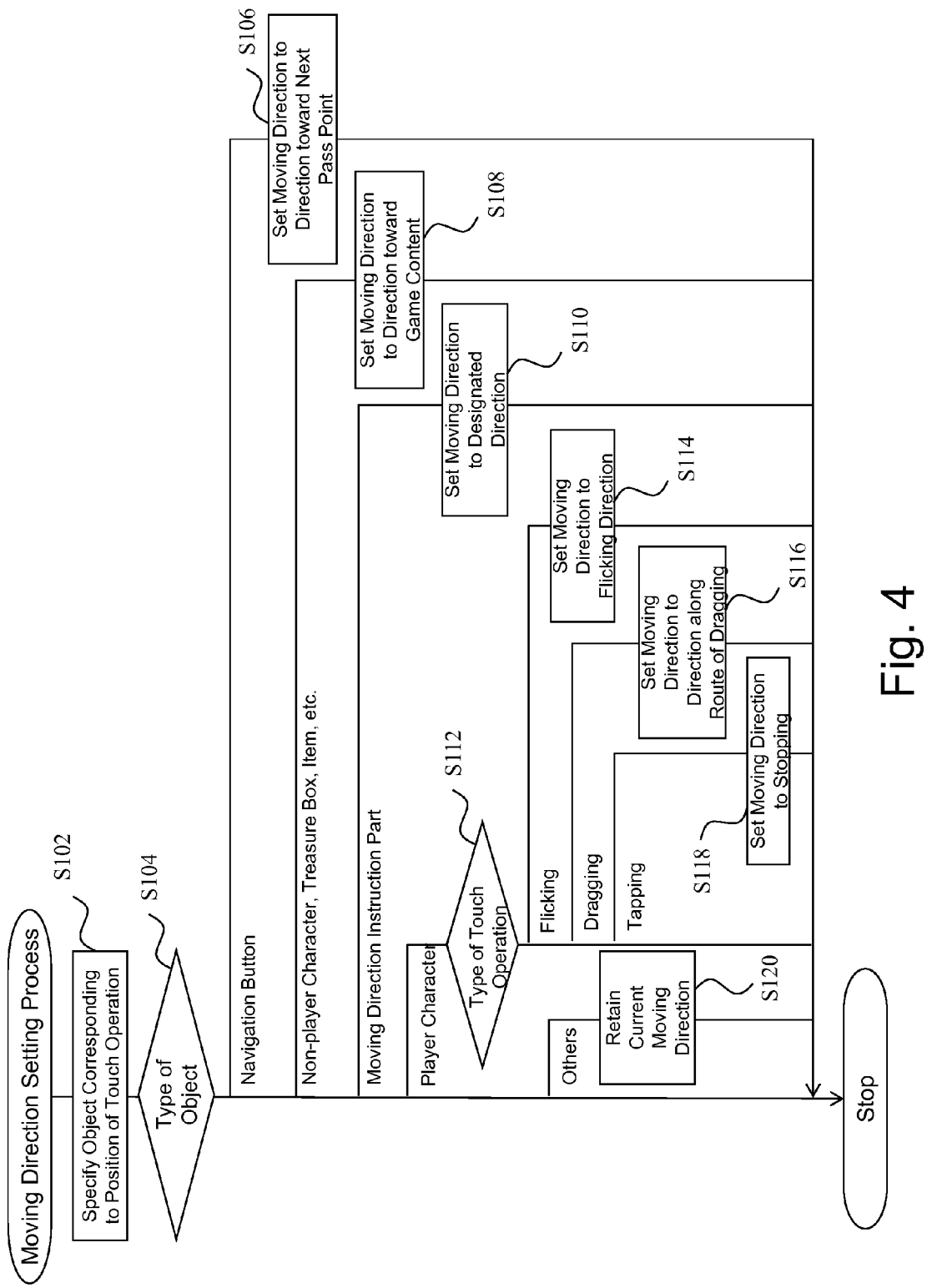
FIG. 4 is a flow diagram showing an example of a moving direction setting process according to an embodiment.

FIG. 4 is a flow diagram showing an example of a moving direction setting process for setting a moving direction of a player character. This process may be performed by the moving direction setting unit 55 upon detection of a touch operation on the touch panel included in the user I/F 33 (display device) of a terminal device 30. A game field screen in an embodiment will now be described which is displayed on the display device of the terminal device 30 operated by a player of a role playing game.

Figure 5:
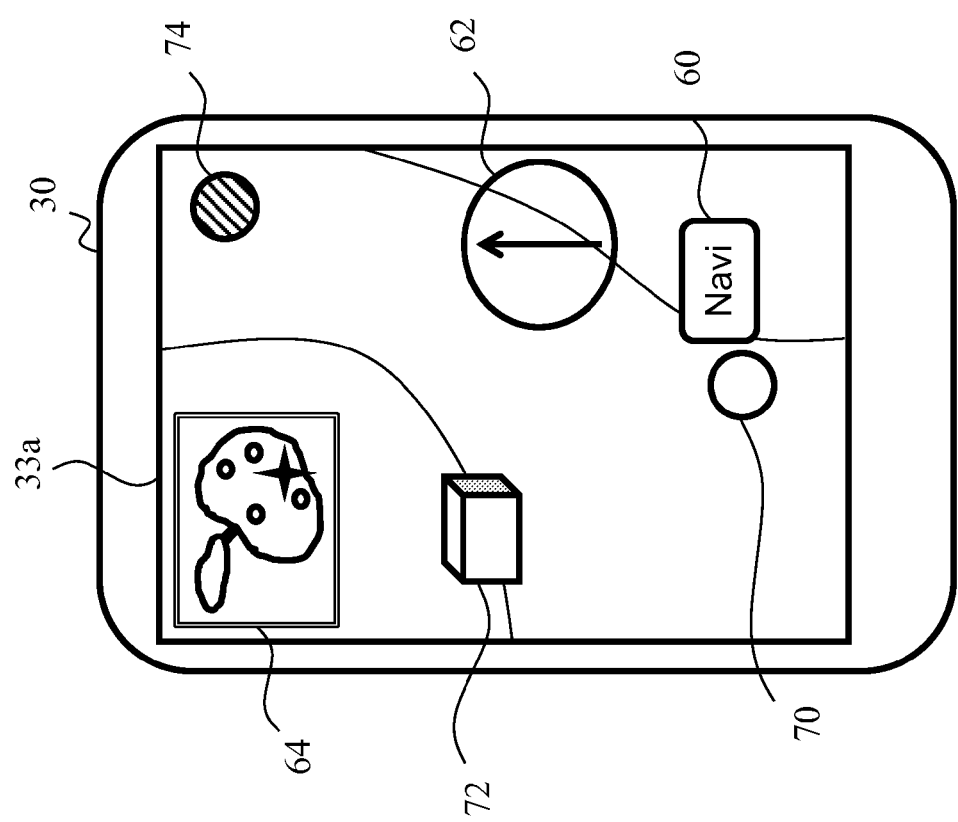
FIG. 5 is an external view of a terminal device displaying a game field screen according to an embodiment.

FIG. 5 is an external view of a terminal device 30 displaying an example of a game field screen according to an embodiment. As shown, the terminal device 30 may include a liquid crystal display 33a in the front. The liquid crystal display 33a may constitute a display device as the user I/F 33 and is entirely covered with a touch panel. The screen is displayed on the liquid crystal display 33a. As shown, the game field screen may entirely display a range of game space based at the current position of the player character 70 displayed around the horizontal center in the lower part of the screen area. The game field screen may also contain a navigation button 60 positioned in the lower right part of the display area, a moving direction instruction part 62 positioned above the navigation button 60, the moving direction instruction part 62 indicating the current moving direction of the player character 70 with an arrow and being capable of receiving an instruction for the moving direction from the player, and an entire map area 64 positioned in the upper left corner of the display area, the entire map area 64 displaying the entirety of the game space in an overhead view. These objects are displayed over and in front of the game space displayed. The default display positions of these objects, displayed over and in front of the game space, may be set to the above described positions. These display positions may not be changed with movement (change of current position) of the player character 70. The game space contains various game contents used in the game such as the treasure box 72 and the enemy character 74 shown as examples in the game field screen of FIG. 5, in addition to the player character 70. When a range of game space displayed on the game field screen includes these game contents, images representing the game contents are displayed at corresponding positions. Additionally, in this example, the game space is depicted as viewed from above, but this is not limitative. For example, the game space may be depicted in view of a virtual camera following the player character 70. In this case, an object between the player character 70 and the virtual camera may be drawn transparent or translucent. The moving direction instruction part 62 may be translucent with a predetermined transparency (e.g., 70%); the player can see a part of game space covered with the moving direction instruction part 62. Such a game field screen may be generated by the display image generating unit 54 based on the landform data DB stored in the information storage unit 52 and the information managed in the game content management table, and may be displayed on the liquid crystal display 33a of the terminal device 30. When the game field screen is thus displayed on the liquid crystal display 33a, a detection of a touch operation on the touch panel may trigger a moving direction setting process as illustrated in FIG. 4.

Referring back to the flow diagram shown in FIG. 4, the first step of the moving direction setting process is to specify an object on the game field screen corresponding to the position of the touch operation on the touch panel (step S102). If the touch operation is made on any one of the navigation button 60, the moving direction instruction part 62, and the entire map area 64 which are displayed over and in front of the game contents in the game space, the specified object may be the navigation button 60, the moving direction instruction part 62, or the entire map area 64 which is displayed over and in front of the game contents.

Figure 6:
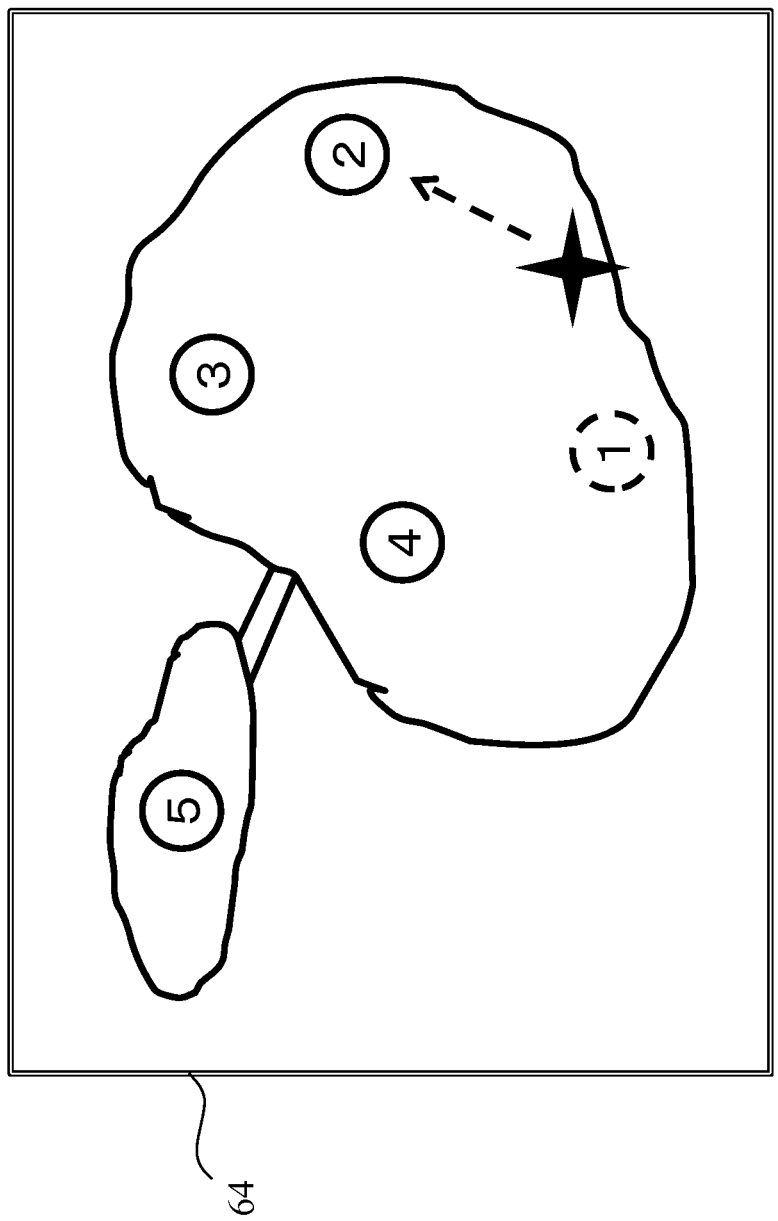
FIG. 6 is a diagram showing an entire map area of a game field screen according to an embodiment.
Figure 7:
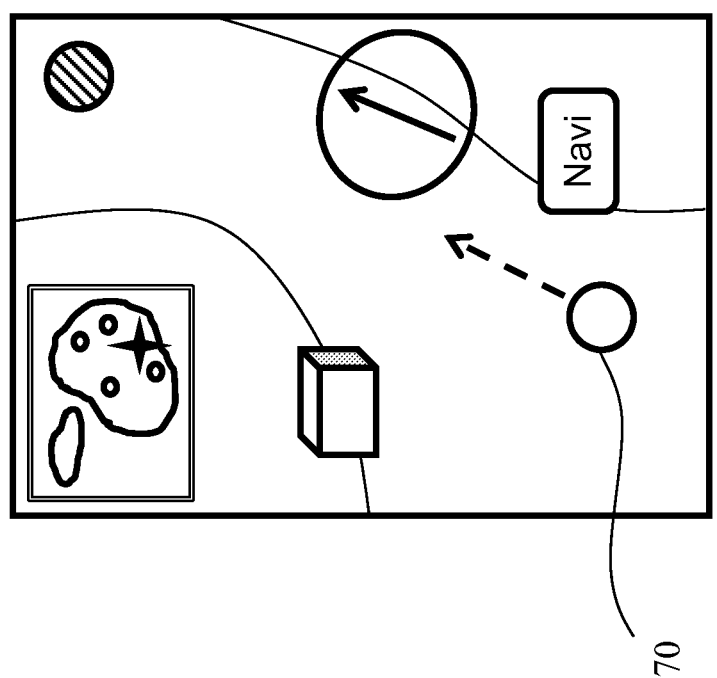
FIG. 7 is a diagram showing an example of a game field screen according to an embodiment.

After the object corresponding to the position of the touch operation is specified, the moving direction of a player character is set in accordance with the type of the specified object (steps S104 to S120). First, if the type of the object corresponding to the position of the touch operation is navigation button 60, the moving direction may be set to the direction from the current position of the player character toward the next pass point to be cleared among the above described pass points corresponding to the missions (step S106). FIG. 6 is an enlarged view of the entire map area 64 in the game field screen shown in FIG. 5. As shown, in the entire map area 64, the current position of the player character in the game space is indicated with a cross mark, and a pass point set in the game space is indicated with a circled sign. The pass points are provided with an order in which to be cleared; and numbers indicating the order are displayed inside the circles. Additionally, pass points already cleared by the player may be indicated by a dotted circle, and pass points yet to be cleared by the player may be indicated by a solid line circle. In the example shown in FIG. 6, only the first pass point to be cleared is indicated by a dotted circle; therefore, only the first pass point has been cleared, and the next pass point to be cleared is the second pass point. In this case, the moving direction may be set to the direction (represented by the dotted arrows in FIGS. 6 and 7) from the current position of the player character, indicated by the cross mark, toward the second pass point. The current position of the player character and the positions of the pass points may be managed by "Position" in the game content management table in the information storage unit 52 stored for the player character and boss characters present at the pass points. Further, the pass points may be managed by the information storage unit 52 for information other than position (the order in which to be cleared and whether or not a pass point has been cleared). For example, columns corresponding to these information may be provided to the game content management table to store and manage these information on the records of boss characters corresponding to the pass points.

Specifically, the moving direction may be set by storing the moving direction of the player character in the information storage unit 52; for example, a corresponding column may be provided to the game content management table to store the moving direction on the record of the player character. The moving direction may be stored in the form of a geographical direction (e.g., north, northeast, east, southeast, south, southwest, west, and northwest), an angle relative to north (the direction of 12 o'clock) (e.g., 45°, 90°, 135°, 180°, 225°, 270°, 315°, and 360°), or a destination (the position of the next pass point to be cleared). The units of the geographical direction and angle for setting the moving direction are not limited to those mentioned above.

Figure 8:
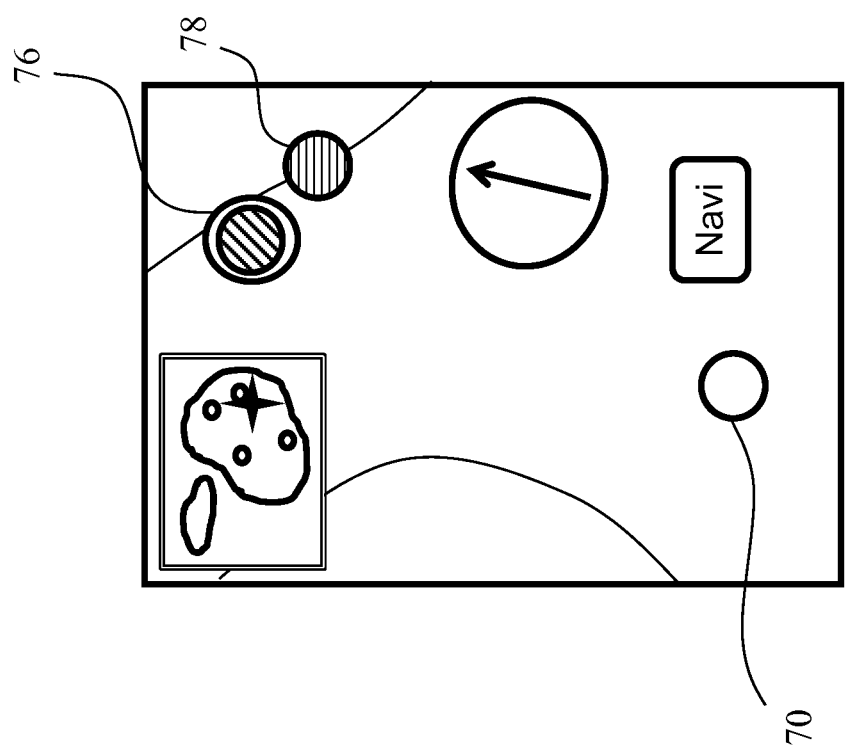
FIG. 8 is a diagram showing an example of a game field screen according to an embodiment.

FIG. 8 is an example of a game field screen displaying a game space including a pass point. In FIG. 8, the position where the boss character 76 is present is the pass point if the player character 70 continues to move in the direction set in step S106, the player character 70 may encounter the boss character 76 and battle with it for clearing a mission. In an embodiment as shown in FIG. 8, a navigation character 78, a non-player character, may be displayed in the vicinity (e.g., on the lower right) of the position of the pass point where the boss character 76 is present. The player may move toward the navigation character 78 as a mark of the direction of the pass point. The navigation character 78 may be positioned to the next pass point to be cleared; when the player clears a pass point, the navigation character 78 may be moved to the next pass point to be cleared. Such a movement of the navigation character 78 may be controlled by the non-player character control unit 57.

Figure 9:
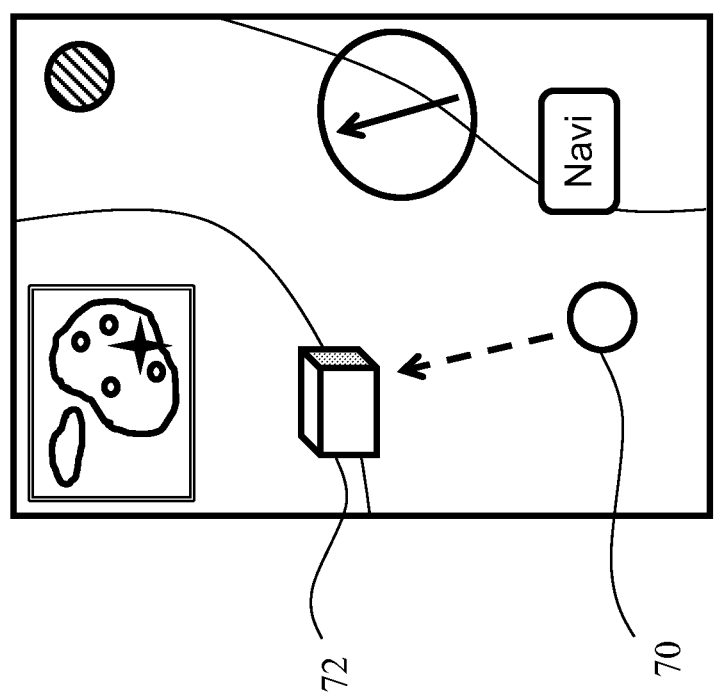
FIG. 9 is a diagram showing an example of a game field screen according to an embodiment.

Referring back to the flow diagram of FIG. 4, if the type of the object corresponding to the position of the touch operation is a game content other than the player character, the moving direction may be set to the direction from the current position of the player character toward the position of the game content (step S108). The game contents other than the player character may include non-player characters, treasure boxes, items, and player characters of other players. For example, if a touch operation is made on the touch panel at the position where a treasure box 72 is displayed as in FIG. 9, the moving direction may be set to the direction from the current position of the player character 70 toward the position of the treasure box 72, indicated by the dotted arrow in FIG. 9. When the player hopes to obtain a treasure box or an item, battle with a non-player character (enemy character), or enjoy conversation with a non-player character, the player may touch the position where such a game content is displayed so as to move the player character 70 toward the game content. If the game content is a treasure box that has already been opened, the moving direction may also remain unchanged without being newly set. The information of whether or not a treasure box has already been opened may be managed by the information storage unit 52; for example, a corresponding column may be provided to the game content management table to store this information in the record of the treasure box.

The moving direction may be set to a geographical direction, an angle relative to north, a destination (the position of a game content), etc.

Figure 10:
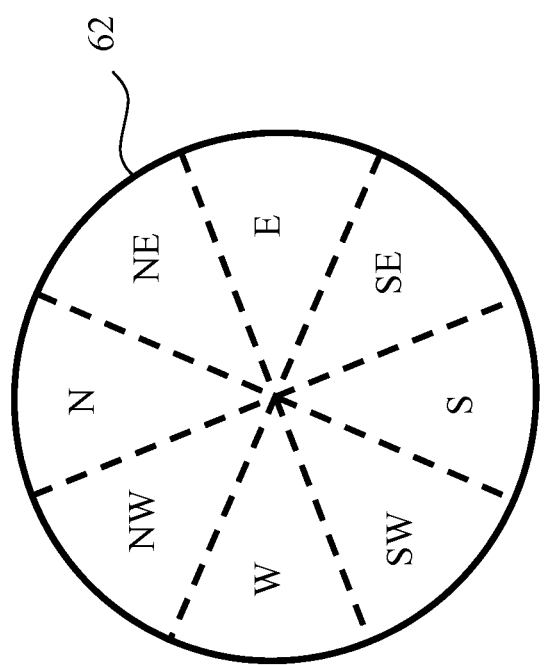
FIG. 10 is a diagram showing a moving direction instruction part in a game field screen according to an embodiment.

If the type of the object corresponding to the position of the touch operation is the moving direction instruction part 62, the moving direction may be set to the direction corresponding to the position of the touch operation in the moving direction instruction part 62 (step S110). In an embodiment as shown in FIG. 10, the area inside the moving direction instruction part 62 shaped in a circle may be an object divided from the center into eight sector areas corresponding to directions of north, northwest, west, southwest, south, southeast, east, and northeast; and the moving direction may be set to the direction corresponding to the touched sector area. For example, when the area marked with "E" in FIG. 10 is touched, the moving direction may be set to east and when the area marked with "NW" is touched, the moving direction may be set to northwest. Thus, the moving direction instruction part 62 may indicate the current moving direction of the player character 70 and may also receive the instruction for the moving direction of the player character 70. The moving direction may be set in the form of a geographical direction, an angle relative to north, etc.

Figure 11:
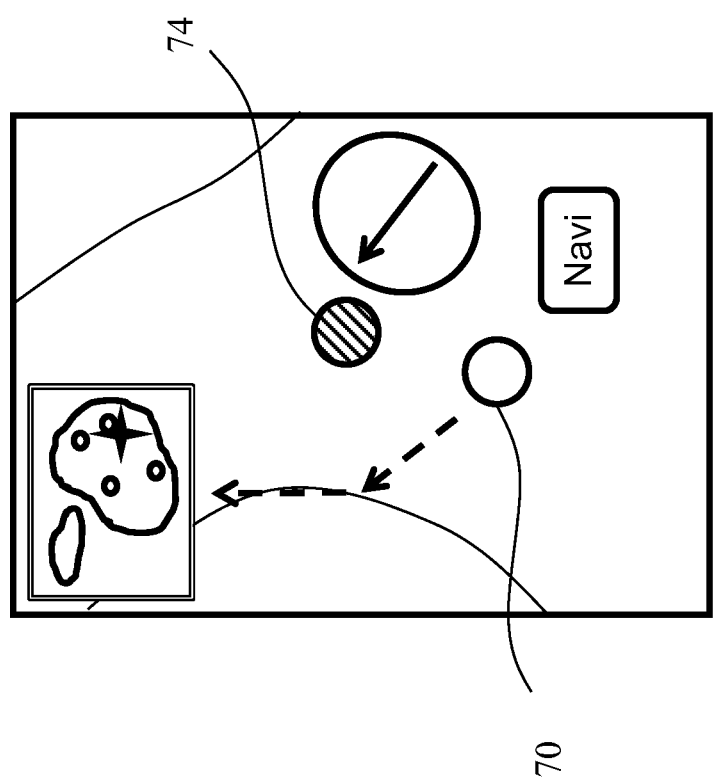
FIG. 11 is a diagram showing an example of a game field screen according to an embodiment.
Figure 12:
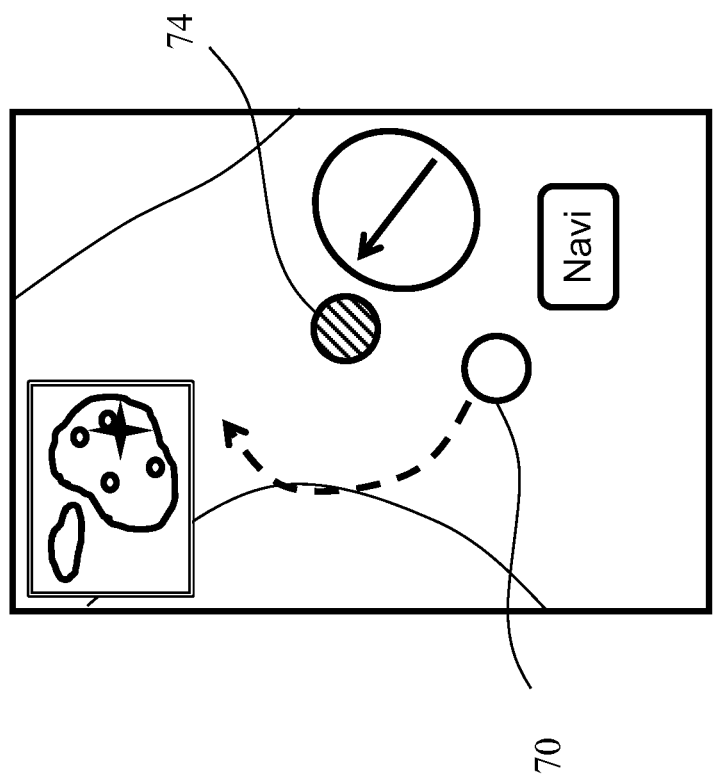
FIG. 12 is a diagram showing an example of a game field screen according to an embodiment.

If the type of the object corresponding to the position of the touch operation is player character, the type of the touch operation is further determined (step S112), and the moving direction may be set in accordance with the determination result. In an embodiment, the types of the touch operation may include "tapping," or lightly patting the touch panel, "flicking," or lightly sweeping the touch panel, and "dragging," or sliding a finger on the touch panel. If the type of the touch operation is determined to be flicking, the moving direction may be set to the direction of flicking (step S114); if the type of the touch operation is determined to be dragging, the moving direction may be set to the direction along the route of dragging (step S116); and if the type of the touch operation is determined to be tapping, the player character 70 may be stopped. FIG. 11 shows how the player performs flicking of the player character 70. For example, one way to avoid a battle with an enemy character 74 in the path of the player character is to first perform flicking northwest to avoid the enemy character 74 and then to perform flicking north to adjust the moving direction, as indicated by the dotted arrows in FIG. 11. When flicking is performed in an area within a predetermined range from the position of the player character 70, as well as when the flicking is performed on the player character 70, the moving direction may be set to the flicking direction. Additionally, the player character 70 may perform a predetermined action (e.g., slightly tilting opposite to the direction of the movement to be started) before it starts moving in the flicking direction in accordance with the flicking operation. This action may allow the player to perceive the flicking and notice that the movement in the flicking direction is being started FIG. 12 shows how the player performs dragging of the player character 70. One way to avoid a battle with the enemy character 74 as in FIG. 11 is to perform dragging so as to avoid the enemy character as indicated by the dotted arrow in FIG. 12, thereby to move the player character 70 along the route of the dragging. In the example shown in FIG. 12, dragging is performed so as to turn round the enemy character 74 along the left side, wherein the moving direction may be set to northwest, north, and northeast in this order. Upon tapping to stop the player character, the moving direction may be set to a special value (e.g., null) for example. Thus, the operations of flicking, dragging, and tapping can be combined for operating the player character 70; for example, the player character 70 may be stopped by tapping on the course of the movement of the player character 70 in the moving direction set by flicking or dragging.

Finally, if the type of the object corresponding to the position of the touch operation is another type (e.g., entire map are 64), the current moving direction may be retained (step S120). The case where "the type of the object corresponding to the position of the touch operation is another type" may include the case where no object is present at the position of the touch operation (e.g., the case where only landform data of the game screen is displayed at the position of the touch operation). On completion of the above series of steps for setting the moving direction of the player character in accordance with the type of the object corresponding to the position of the touch operation, the moving direction setting process may be ended.

After the above moving direction setting process according to an embodiment wherein the moving direction of the player character 70 is set to a geographical direction, an angle relative to north, or a destination, the player character control unit 56 may control the movement of the player character 70 in accordance with the set moving direction. More specifically, for example, the current position (managed by "Position" in the game content management table) of the player character 70 may be repeatedly updated at regular intervals by the player character control unit 56 (of, e.g., 0.2 second) such that it moves in the set moving direction. When the player character 70 is stopped, the current position of the player character 70 may be retained. Additionally, it may also be possible that the space where the player character 70 can move around should be predefined within the game space by, e.g., the landform data DB, and the player character 70 should move within this space only. In this case, when the player character 70 reaches a point beyond which it cannot further move in the set moving direction, the player character 70 may be either stopped at the point or moved along the border of the space where it can move around. When the player character control unit 56 repeatedly updates the current position of the player character 70, the display image generating unit 54 may repeatedly generate an image representing a range of game space based at the updated current position, and this image may be reflected on the game field screen. When a corresponding command is executed during movement of the player character 70, the player can transition to a screen other than the game field screen (e.g., a screen for battling with another player). In this case, the movement of the player character 70 may be either stopped or resumed upon transition to the other screen.

Next, the operation of the player character control unit 56 for stopping the player character 70 will now be described. As described above, tapping the player character 70 may stop the player character 70. Additionally, when game contents such as an item, treasure box, or non-player character appear in the vicinity (within a predetermined range) of the player character 70 moving, and when, in response, a pop-up screen for confirming the player's intention for acquisition of the item or conversation with the character is displayed and the player's intention is confirmed by a touch operation, the player character control unit 56 may stop the player character 70. More specifically, for example, the moving direction may be set to a special value (e.g., null) for retaining the current position of the player character 70. Then, the game progression control unit 51, etc. may perform a process for obtaining an item, opening a treasure box, or battling or conversing with a non-player character. Since such processes are conventional, further detailed description will be omitted.

As describe above, the embodiment of the present invention may include: specifying an object on the game field screen corresponding to the position of a touch operation on the touch panel; setting the moving direction of the player character in accordance with the type of the specified object; and controlling the movement of the player character in accordance with the set moving direction. The player can operate the player character in accordance with the type of the object he touches; thus, it may be possible to enjoy movement of the character in the game space through such operations.

Further, in an embodiment of the present invention, when the type of the object corresponding to the position of a touch operation is navigation button 60, the moving direction may be set to the direction toward the next pass point to be cleared. Accordingly, players who prefer fulfilling the game target early to freely move in the game space should only press the navigation button 60. Further, the navigation button 60, positioned in the lower half area (or the lower right area in an embodiment) of the game field screen, may be readily operated when the terminal device 30 is held with a single hand. The navigation button 60, which may remain at its display position during movement of the player character, may be further readily operated. When an object other than the navigation button 60 is displayed in the area where the navigation button 60 is positioned, the navigation button 60 may be moved to any other position. Further, in an embodiment of the present invention, when the type of the object corresponding to the position of a touch operation is a game content other than the player character, the moving direction may be set to the direction toward the position of the game content. Accordingly, players hoping to obtain an item or treasure box or enjoy a battle or conversation with a non-player character, etc. should only touch the game content. In an embodiment of the present invention, when the type of the object corresponding to the position of a touch operation is moving direction instruction part 62, the moving direction may be set to the direction corresponding to the position of the touch operation in the moving direction instruction part 62; and when the type of the object corresponding to the position of a touch operation is player character, the moving direction may be set in accordance with the type of the touch operation (flicking, dragging, or tapping). This may allow players to designate a specific moving direction by themselves. Further, in an embodiment of the present invention, after one of the above touch operations is made to set the moving direction of the player character, another touch operation may be made to stop the ongoing movement control and start another movement control; thus, combination of various movement controls is possible. In the embodiment of the present invention as described above, operations for movement of a player character required by various users in various scenes may be made through touch operations on an object.

The server device 10 according to the embodiment may provide objects accepting touch operations for setting the moving direction such as the navigation button 60, game contents other than the player character, the moving direction instruction part 62, and the player character 70; and it may be also possible that, only when a part of these objects is touched, the moving direction should be set in accordance with the type of the touched object. Additionally, it may be also possible that, when an object other than those stated above as examples is touched, the moving direction should be set in accordance with the type of the object. For example, when the entire map area 64 is touched, the entire map area 64 may be enlarged; and when the enlarged entire map area 64 is touched again at a desired position, the moving direction may be set to the direction toward the desired position.

In the server device 10 according to the embodiment, when the type of the object corresponding to the position of a touch operation is navigation button 60, the moving direction may be set to the direction toward the next pass point to be cleared; and it may also be possible as an embodiment of the present invention that the pass points should not be provided with the order in which to be cleared. In this case, for example, the moving direction may be set to a direction toward a pass point randomly selected from the pass points yet to be cleared or a direction toward a pass point closest to the current position of the player character 70.

In the server device 10 according to the embodiment, the navigation button 60 may be positioned in the lower half area (or in the lower right area in an embodiment) of the game field screen; it may also be possible to position the navigation button 60 at any other positions. Additionally, the moving direction instruction part 62, described as being translucent in the embodiment, may not necessarily be translucent. Further, in the embodiment, the moving direction instruction part 62 may indicate the current moving direction of the player character 70 and may also receive the instruction for the moving direction of the player character 70; and it may also be possible that the moving direction instruction part 62 should only indicate the current moving direction and should not receive an instruction for the moving direction.

In the embodiment, the server device 10 may serve as a game providing device according to an embodiment of the present invention; and it may also be possible that the terminal device 30 in the embodiment should serve as a game providing device according to an embodiment of the present invention. That is, the functions of the server device 10 shown in FIG. 2 may also be implemented through cooperation between the CPU 31 of the terminal device 30 and various programs, tables, and the like stored in the main memory 32 and the external memory 35.

Figure 13:
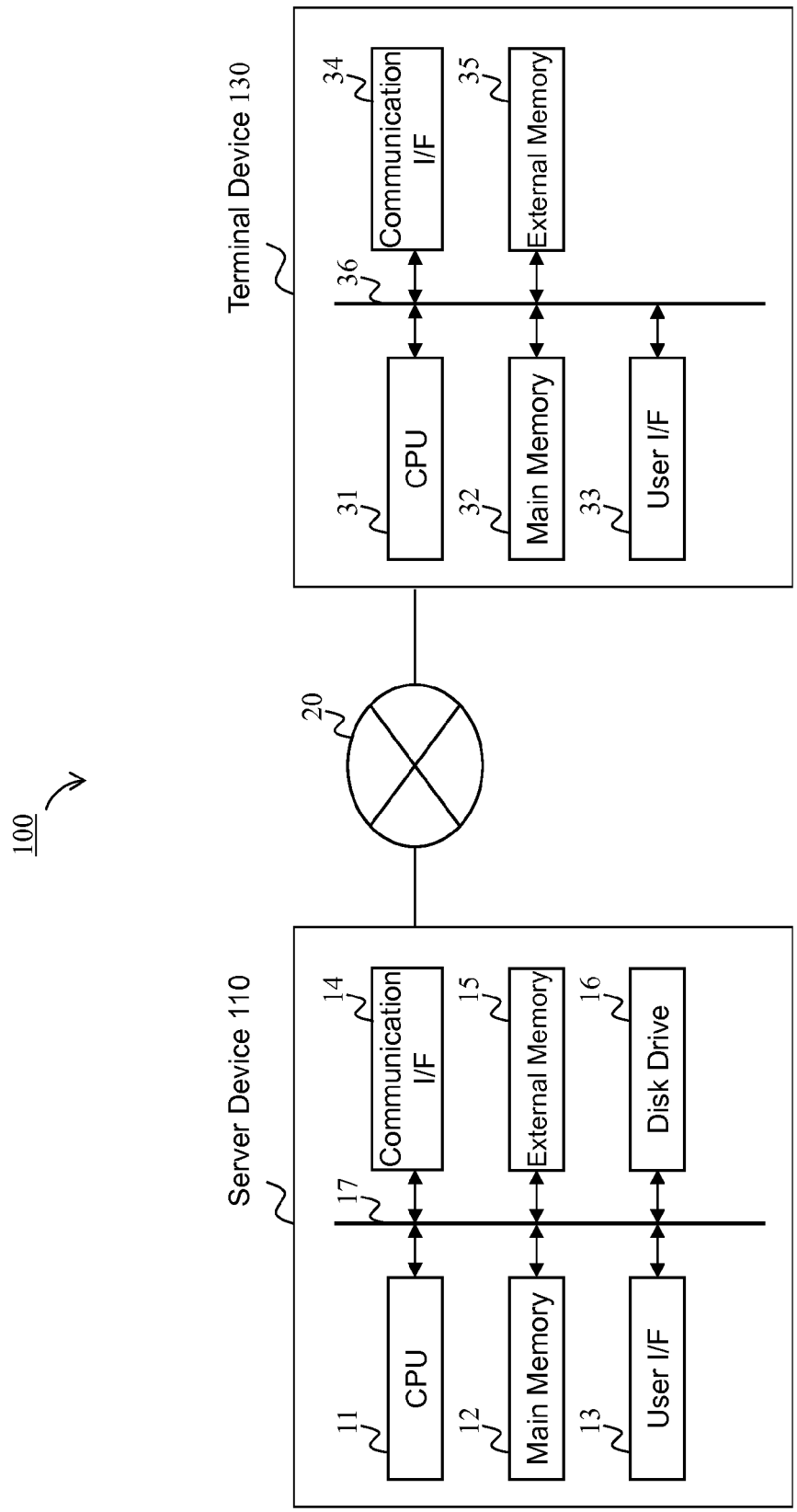
FIG. 13 is a block diagram schematically illustrating a game providing system according to an embodiment.
Figure 14:
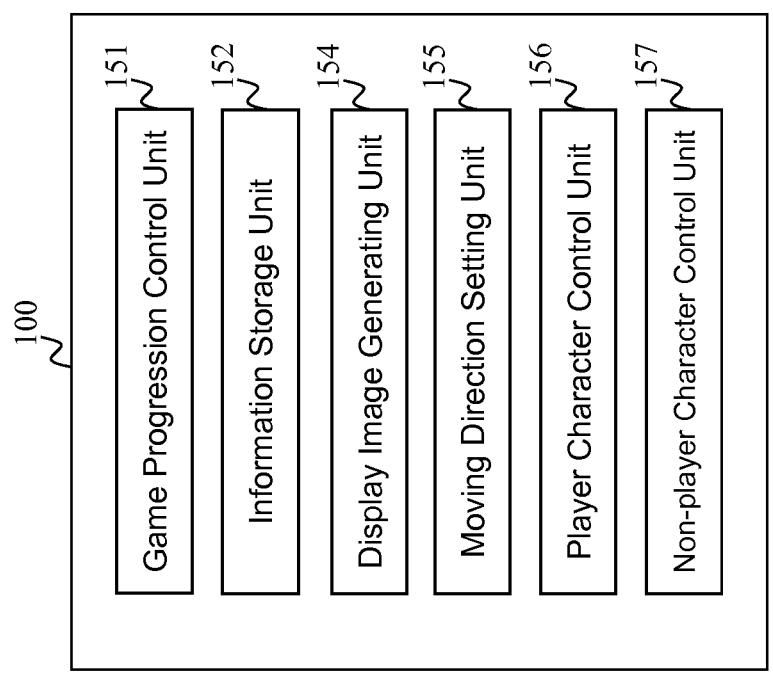
FIG. 14 is a block diagram illustrating the functionality of a game providing system according to an embodiment.

Next, the game providing system 100 will now be described, which may serve as a game providing system according to an embodiment of the present invention. FIG. 13 is a block diagram showing the configuration of the game providing system 100 according to an embodiment and FIG. 14 is a block diagram showing the functions of the game providing system 100. As shown, the game providing system 100 according to an embodiment may comprise a server device 110 and a terminal device 130 communicatively connected to the server device 110 via a communication network 20 such as the Internet; and the game providing system 100 may provide games to a player operating the terminal device 130. As shown, the server device 110 of the game providing system 100 may have the same hardware configuration as the above described server device 10; and the terminal device 130 of the game providing system 100 may have the same hardware configuration as the above described terminal device 30.

FIG. 14 is a block diagram schematically illustrating the functions of a game providing system 100 according to an embodiment. As shown, the game providing system 100 may have the same functions as the above described server device 10; and these functions may be implemented through cooperation between the CPU 11 and various programs and tables stored in the main memory 12 and the external memory 15 of the server device 110, and the CPU 31 and various programs and tables stored in the main memory 32 and the external memory 35 of the terminal device 130. The operations of the game providing system 100 thus configured may be the same as those of the above described server device 10 and may be implemented through cooperation between the server device 110 and the terminal device 130.

Game contents are not limited to characters, items, or treasure boxes which may be used in the embodiment as examples; game contents may include electronic cards, items, avatars, and all other types of electronic data used in games.

The processes and procedures described and illustrated herein may be implemented by software, hardware, or any combination thereof including those explicitly stated for the embodiments. More specifically, the processes and procedures described and illustrated herein may be implemented by the installation of the logic corresponding to the processes into a medium such as an integrated circuit, a volatile memory, a non-volatile memory, a magnetic disk, or an optical storage. The processes and procedures described and illustrated herein may also be installed in the form of a computer program, and executed by various computers.

Even if the processes and the procedures described herein are executed by a single apparatus, software piece, component, or module, such processes and procedures may also be executed by a plurality of apparatuses, software pieces, components, and/or modules. Even if the data, tables, or databases described in the specification are stored in a single memory, such data, tables, or databases may be dispersed and stored in a plurality of memories included in a single apparatus or in a plurality of memories dispersed and arranged in a plurality of apparatuses. The elements of the software and the hardware described herein can be integrated into fewer constituent elements or can be decomposed into more constituent elements.

With respect to the use of substantially any plural and/or singular terms herein, those having skill in the art can translate from the plural to the singular and/or from the singular to the plural as is appropriate to the context.

What is claimed is:

1. A game providing device for providing a game wherein a player operates a player character in a game space, the game providing device being communicatively connected to a display device having a touch panel, the game providing device comprising:
    a display image generating unit configured to generate a display image including an image of the game space corresponding to a current position of the player character in the game space and display the display image on the display device;
    a moving direction setting unit configured to set a moving direction of the player character based at least on a type of an object on the display image corresponding to a position of a touch operation on the touch panel by the player; and
    a player character control unit configured to control the player character such that the player character moves in the set moving direction,
    wherein the game space includes one or more pass points set previously, and
    wherein when the object corresponding to the position of the touch operation is a predetermined button, the moving direction setting unit sets the moving direction to a direction from the current position toward one target pass point included in the one or more pass points; and when the touch operation is performed on a position corresponding to another object of a type other than the predetermined button while the player character is moving in the direction toward the target pass point, the moving direction setting unit sets the moving direction to a direction based at least on the type of the other object in place of the direction toward the target pass point.

2. The game providing device of claim 1, wherein
    the one or more pass points are points to be cleared by the player character; and
    the target pass point is a point selected from the one or more pass points based on a predetermined rule.

3. The game providing device of claim 2, wherein the target pass point is selected from the plurality of pass points based on an order of the pass points to be cleared, the order being previously provided to the plurality of pass points.

4. The game providing device of claim 1 further comprising a non-player character control unit for controlling a predetermined non-player character such that the non-player character is positioned at the target pass point.

5. The game providing device of claim 1, wherein the predetermined button is an object positioned at a predetermined position on the display image as a default position, irrespective of the current position of the player character.

6. The game providing device of claim 5, wherein the predetermined position on the display image is in a lower half area of the display image.

7. The game providing device of claim 1 wherein, when the object corresponding to the position of the touch operation is a first predetermined game content positioned in the game space, the moving direction setting unit sets the moving direction to a direction from the current position toward a position of the first predetermined game content.

8. The game providing device of claim 7, wherein the first predetermined game content includes at least one of an item, a treasure box, and a non-player character.

9. The game providing device of claim 1 wherein, when the object corresponding to the position of the touch operation is the player character, the moving direction setting unit sets the moving direction in accordance with a type of the touch operation.

10. The game providing device of claim 9 wherein, when the type of the touch operation is flicking, the moving direction setting unit sets the moving direction to a direction of the flicking.

11. The game providing device of claim 9 wherein, when the type of the touch operation is dragging, the moving direction setting unit sets the moving direction to a direction along a route of the dragging.

12. The game providing device of claim 1, wherein the image generating unit generates the display image including an moving direction indicating object indicating the moving direction set by the moving direction setting unit.

13. The game providing device of claim 12, wherein the moving direction indicating object is translucent with a predetermined transparency.

14. The game providing device of claim 12 wherein, when the object corresponding to the position of the touch operation is the moving direction indicating object, the moving direction setting unit sets the moving direction to a direction determined in accordance with the position of the touch operation in the moving direction indicating object.

15. The game providing device of claim 1 wherein, when a second predetermined game content is present within a predetermined range based at the current position of the player character moving, the player character control unit controls the player character so as to stop the player character.

\* \* \* \* \*